May 25, 1954     F. D. TIMMERMANS     2,679,245

PROSTHESIS FOR FEMORAL HEAD

Filed March 15, 1951

INVENTOR.
*Frans Donatus Timmermans*
BY
AG'T

Patented May 25, 1954

2,679,245

UNITED STATES PATENT OFFICE 2,679,245

PROSTHESIS FOR FEMORAL HEADS

Frans Donatus Timmermans, Hilversum, Netherlands

Application March 15, 1951, Serial No. 215,671

Claims priority, application Germany March 20, 1950

12 Claims. (Cl. 128—92)

This invention relates to prostheses for arthroplasty and more specifically to prostheses made from synthetic materials suitable for injection molding, and to processes for the production of said prostheses.

At this time, the most commonly used prosthesis of a joint is the one of the head of the femur which may consist of a cap or of a round or polygonal shaft attached to a cap so as to form a mushroom-shaped piece. The cap may consist of a hemispherical solid portion with a protruding rim of generally cylindrical shape which will surround the neck of the femur while the shaft is anchored inside the neck.

It is known to make prostheses of this kind from methyl methacrylate and from polyurethane. The known prostheses, however, have the disadvantage of not offering adequate fixation inside the bone. Due to their method of production by turning, arthroplastic prostheses made from methyl methacrylate have been of circular cross section and only the point of the shaft is of angular section. Prostheses made from polyurethane have been made with other than round shafts, particularly with shafts of quadrangular section. According to the present invention, such prostheses are provided with special means for preventing rotation and longitudinal displacement along the axis of the shaft. This results in excellent fixation of the prosthesis to the bone which satisfies all requirements.

According to the method of the invention, such arthroplastic prostheses are produced by injection molding. Only by this method is it possible to produce in an economical way the shapes described by this invention. It has furthermore been shown that certain synthetic materials which are suitable for injection molding cannot be worked by machining since their best mechanical properties can be obtained only when the materials are used in thin sections. The size and the special shapes of prostheses according to the invention have presented difficult problems to the art of injection molding and have necessitated the use of novel methods of molding which therefore also are essential parts of the invention.

The specification is accompanied by a drawing in which.

Figure 1:
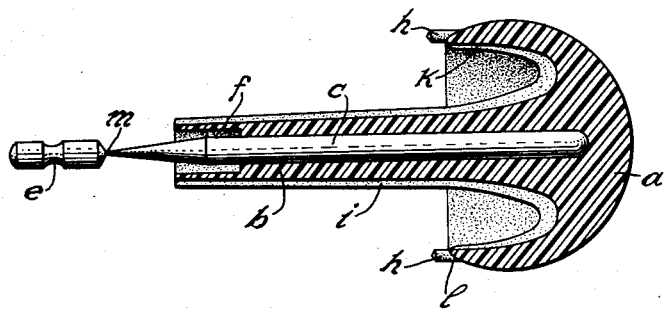
Fig. 1 is a longitudinal section through a prosthesis according to my invention for a femoral head, this view being explanatory of the manufacture of the prosthesis.
Figure 2:
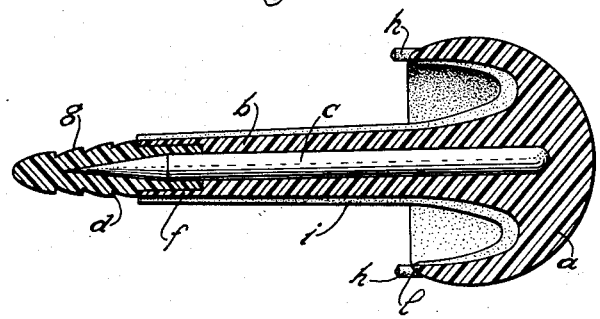
Fig. 2 is a longitudinal section through the completed prosthesis.

Referring to the drawing, and more particularly to Figs. 1 and 2, the prosthesis consists of a cap $a$ and a shaft $b$.

To secure the prosthesis against longitudinal displacement, transversal ridges are provided at the lower end of the shaft. Once the prosthesis is properly positioned, applied stresses will be detrimental only when applied as tensile stresses. The transversal ridges are, therefore, given a saw tooth profile in such a way as not to offer much resistance to further penetration of the shaft into the bone, but to lock it firmly when tensile stresses are applied. In Fig. 2 a prosthesis according to the invention is shown in longitudinal section with the profile of the ridges indicated at $(d)$.

Figure 3B:
Fig. 3B is a cross section taken in the plane of the line 3B—3B of Fig. 3.
Figure 3:
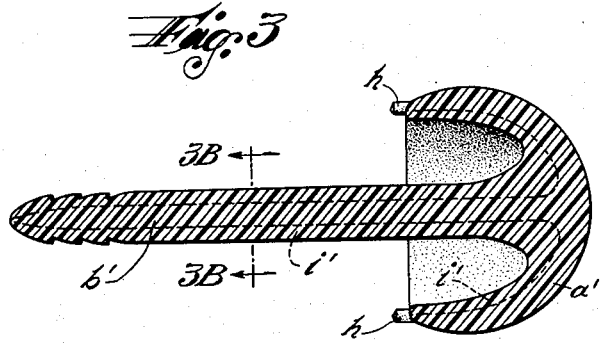
Fig. 3 is a longitudinal section through a modified prosthesis.

Means for preventing rotation of the prosthesis are provided not only at the shaft but ribs are located in the concave portion of the cap (Figs. 1 and 2, $i$) and pins protrude over the rim of the cap as shown in the sectional drawings of Figs. 1, 2 and 3, $h$, and may form extensions of the ribs $i$. Further means for preventing rotation of the prosthesis may be provided by not giving a smooth surface to the peripheral wall $k$ of the cap, but by using e. g. a knurled surface. It is possible to secure the rim $l$ of the cap against rotation by serrations instead of protruding pins $h$. It is essential to locate obstacles against rotation at the peripheral part of the cap so as to gain a mechanical advantage as compared to location on the shaft of the prosthesis only.

In the example of the invention shown in Fig. 3, the cap of the prosthesis is formed by a shell of relatively thin section reinforced by ribs $i'$, which run without major change in cross sectional area along both the cap and the shaft. This shaft may have a star-shaped cross section. The number of points of this "star" is determined by the number of reinforcing ribs. I prefer to use four ribs which in the center of the cap merge into a shaft of cross-shaped section such as shown in Fig. 3B. When using a cross section of this type, one avoids development of shrinkage tension which normally builds up where the cap is joined to a shaft of circular section. In a cylindrical shaft, the material on solidification shrinks radially towards the axis of the cylinder, in the cap however shrinkage is directed towards the center of inertia of the section a space which is located towards the periphery of the cap. A shear stress therefore develops in the region of transition from the cap of the prosthesis to the shaft and mechanical shock may cause the cap to break from the shaft. According to the invention increasing diameter of the shaft or its ribs approximating to the cap extends this region and reduces the stress.

If the material is not sufficiently plastic to take such shrinkage stresses without damage, an axial channel is molded in. This channel passes through the shaft and extends into the cap. On solidification, this channel will expand in the cap of the prosthesis and will shrink in the shaft thus reducing the shrinkage tension. It is customary to reinforce a prosthesis of this type if made from a synthetic material with a corrosion resistant metal rod ($c$ in Figs. 1 and 2). When a channel is formed in the molding operation, it may receive the reinforcing rod $c$. The bottom portion $g$ is later cast on or cemented on. The example of the invention shown in Fig. 2 may be produced by this technique.

Fig. 1 illustrates a method of locating a metallic insert as a reinforcing rod if the material is sufficiently plastic to allow for shrinkage tension. The reinforcing rod is inserted in the mold and supported at $e$. The synthetic material is injected and surrounds the reinforcing rod, forming a collar $f$. The supporting part of the rod is then severed at $m$. In a second molding operation the bottom end $g$ is formed and joined to the collar $f$.

When the shaft is given a square-shaped section, I prefer to use a reinforcing rod of cross-shaped section which is positioned in such a way that the arms of the cross coincide with the diagonals of the square. With prostheses of the advanced design illustrated in Fig. 3, use of a reinforcing rod is no longer required, the cap being supported by the enclosed bone and the shaft being subject to tensile stresses only. According to this invention, the concave surface of the cap penetrates into the hemispherical portion as shown in Figs. 1 and 2. This causes the cap to be supported by the bone and bending moments in the shaft $b$ are reduced.

Because of the relatively heavy section of the molded piece which forms the prosthesis, defects may occur which are not encountered in the usually thin walled products of the injection molding art. The material will show greater hardness and brittleness than the usual test rod of 4 mm. by 6 mm. section. Furthermore, bubbles may occur which are due to inclusion of gas or air. These originate either with the liquid synthetic material introduced from the injection cylinder or they are part of the air which originally filled the mold. According to the method of the invention, the properties of the synthetic material used are so adjusted that a test rod of the dimensions described above will appear rather soft so that it may be bent back upon itself without breaking.

This adjustment of properties may be achieved by physical or chemical mixing of different components. As an example of physical mixing, one may add to a hard synthetic material, such as polyurethane, a softer plastic material, such as a polyamide or polysebacyl hexamethylene diamide, in suitably fine dispersion. One may chemically adjust the mechanical properties of a synthetic material by co-polymerization or co-condensation. According to the method of the invention this is achieved by introducing a glycolic group into the synthetic molecule.

To avoid embrittlement, the synthetic material is molten continuously outside of the injection cylinder by means of large heating surfaces or by internal heating with warm inert gases. Thermal gradients are held to a minimum. The molten mass is then introduced into the injection cylinder preferably from above so as to permit escape of occluded gas particles. The cylinder is further heated sufficiently to maintain the temperature of the molten material.

The air is removed from the mold according to the method of the invention by a number of small cavities arranged along the parting surfaces outside of the mold proper so that the air may escape into these cavities during injection with little resistance. Air may also be removed from the mold by the application of vacuum.

I claim:

1. Alloplastic prosthesis for femoral head, comprising a substantially mushroom-shaped cap and a shaft, the underside of the cap being concave and being provided with radially extending rib-like formations, the shaft being provided with transversal ridges.

2. In the prosthesis according to claim 1, the periphery of the concave underside of the cap being provided with radially arranged ribs.

3. In the prosthesis according to claim 1, the cap having a peripheral rim, said rim being provided with serrations.

4. In the prosthesis according to claim 1, the cap having a peripheral rim, said rim being provided with pins.

5. The prosthesis according to claim 1, the cap having a peripheral rim, said rim being provided with protuberances, said protuberances being extended over the concave underside of the cap to follow the shaft and to form a shaft of star-shaped section.

6. In the prosthesis according to claim 1, the cap forming a shell, the underside of the cap being provided with radially arranged reinforcing ribs.

7. In the prosthesis according to claim 6, said ribs extending to follow the shaft and to form a shaft of star-shaped cross section.

8. The prosthesis according to claim 1, the shaft being provided with an axial channel, said channel extending about halfway through the body of the cap.

9. In the prosthesis according to claim 8, a metal rod being positioned in said channel, the free end of the rod carrying a member provided with transversal ridges.

10. The prosthesis according to claim 9, said ridges having a shape similar to several truncated cones located one on top of the other.

11. In the prosthesis according to claim 1, the shaft being provided with an axial channel, a metallic insert being provided in said channel, said insert having a cross section other than circular.

12. In the prosthesis according to claim 11, the shaft having a cross-sectional shape corresponding to the section of said insert.

References Cited in the file of this patent

UNITED STATES PATENTS

| Number | Name | Date |
|---|---|---|
| 2,192,902 | Erdle | Mar. 12, 1940 |
| 2,500,993 | Mason | Mar. 21, 1950 |
| 2,622,592 | Rosenstein | Dec. 23, 1952 |

FOREIGN PATENTS

| Number | Country | Date |
|---|---|---|
| 461,210 | Canada | Nov. 22, 1949 |
| 989,341 | France | May 23, 1951 |

OTHER REFERENCES

The Journal of Bone and Joint Surgery for November 1950, Advertising page 24.